US010885177B2

(12) United States Patent
Peter et al.

(10) Patent No.: US 10,885,177 B2
(45) Date of Patent: Jan. 5, 2021

(54) SYSTEM AND METHOD FOR AUTHENTICATION OF A USER LOGGING INTO AN IT ENABLED APPLICATION

(71) Applicant: HCL TECHNOLOGIES LIMITED, Uttar Pradesh (IN)

(72) Inventors: Jose Peter, North Sydney (AU); Anu Mohan Chalu Parambil, Karnataka (IN)

(73) Assignee: HCL TECHNOLOGIES LIMITED

( * ) Notice: Subject to any disclaimer, the term of this patent is extended or adjusted under 35 U.S.C. 154(b) by 202 days.

(21) Appl. No.: 16/192,227

(22) Filed: Nov. 15, 2018

(65) Prior Publication Data

US 2020/0159903 A1 May 21, 2020

(51) Int. Cl.
*G06F 21/00* (2013.01)
*G06F 21/36* (2013.01)
*H04L 29/06* (2006.01)
*G06K 9/62* (2006.01)

(52) U.S. Cl.
CPC ........... *G06F 21/36* (2013.01); *G06K 9/6202* (2013.01); *H04L 63/083* (2013.01)

(58) Field of Classification Search
CPC ... G06F 21/32; G06F 2221/2117; G06F 21/36
See application file for complete search history.

(56) References Cited

U.S. PATENT DOCUMENTS

| | | | |
|---|---|---|---|
| 8,347,103 B2 | 1/2013 | Jones et al. | |
| 9,064,104 B2 | 6/2015 | Riddiford | |
| 9,106,422 B2 | 8/2015 | Varghese et al. | |
| 9,813,409 B2 | 11/2017 | Zia | |
| 2004/0010721 A1* | 1/2004 | Kirovski | G06F 21/36 713/183 |
| 2007/0277224 A1 | 11/2007 | Osborn et al. | |
| 2012/0300985 A1* | 11/2012 | Ito | G06F 21/32 382/103 |
| 2017/0220790 A1* | 8/2017 | Fonseca | G06F 21/36 |

OTHER PUBLICATIONS

"Image Password Based Authentication in an Android System" Shrutika S. Yande, Renuka C. Walimbe Sep. 2016.
"Authentication Using Images and Pattern" R. B. Sangore, Gaurav Patil, Sagar Ramani, Sunil Pasare.

* cited by examiner

*Primary Examiner* — Ghazal B Shehni
(74) *Attorney, Agent, or Firm* — Hayes Soloway P.C.

(57) ABSTRACT

A system for facilitating authentication of a user based on a polygonal image includes a registration module registering a user by selecting a password artifact comprising a first polygon and a first image from a set of images. The first polygon includes a plurality of grids. The registration module slices the first image to derive a set of sub first images based on the grids and derives a first image pattern by aligning a sub image on each of the grids in accordance with a preference defined by the user. The authentication module authenticates the user by displaying a plurality of password artifacts comprising a plurality of polygons and a plurality of images and derives a second image pattern upon aligning a sub image of a set of sub second images, created by slicing a second image, on each of a plurality of grids associated to the second polygon.

5 Claims, 6 Drawing Sheets

SYSTEM AND METHOD FOR AUTHENTICATION OF A USER LOGGING INTO AN IT ENABLED APPLICATION

CROSS REFERENCE TO RELATED APPLICATIONS

This patent application does not claim priority from any application.

TECHNICAL FIELD

The present subject matter described herein, in general, relates to a method and system for facilitating authentication of a user logging into an Information Technology (IT) enabled application. More specifically, the method and system for authenticating the user based on a polygonal image based authentication technique.

BACKGROUND

Authentication is the means of ultimately letting a user to access resources of a particular system or domain. In order to allow the user to access the resources, the system prompts the user to provide user credentials which then authenticated by the system to authenticate the user. When the user credentials are matched with a pre-set reference values, the user is allowed to access the resources. Otherwise, the system restricts the user for accessing the resources.

It may be noted that evolution in user authentication technology has led to more challenges in providing security for users to safeguard the resources of the particular system. Authentication is one such important aspect of security which provides access control for the users of an application. The common means to authenticate has remained the use of coupling user names along with a textual password. Over a period of time, it has now evolved to use the means of graphical password authentication. This could possibly overcome the vulnerability and security concerns posed by textual password authentication.

However, it may not be disputed that most of the graphical authentication methods available today are still vulnerable to eavesdropping, dictionary attacks and shoulder surfing. It is known that the attempts of hacking are directly proportional to the value of the information uncovered by the authentication credentials. This eventually necessitates the need for additional forms and methods of credential authentication.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for facilitating authentication of a user logging into an Information Technology (IT) enabled application and the concepts are further described below in the detailed description. This summary is not intended to identify essential features of the claimed subject matter nor is it intended for use in limiting the scope of the claimed subject matter.

In one implementation, a system for facilitating authentication of a user logging into an Information Technology (IT) enabled application characterized by authenticating the user based on a polygonal image based authentication technique is disclosed. The system may comprise a processor and a memory coupled to the processor. The processor may execute a plurality of modules present in the memory. The plurality of modules may comprise a registration module and an authentication module. The registration module registers a user on an IT enabled application based on a first set of information pertaining to the user. In one aspect, the registration module registers the user by enabling the user to select a password artifact comprising a first polygon and a first image from a first set of images. The first polygon may comprise a plurality of grids. It may be noted that a grid indicates an area bounded by a set of vertices and a set of edges associated to the first polygon. The registration module further slices the first image in order to derive a set of sub first images based on the plurality of grids. The registration module further derives a first image pattern by aligning a sub image, of the set of sub first images, on each of the plurality of grids in accordance with a preference defined by the user and thereby storing the first image pattern in a system database. The authentication module authenticates the user by displaying a plurality of password artifacts comprising a plurality of polygons and a plurality of images. The plurality of polygons and the plurality of images include the first polygon and the first image. The authentication module further receives a second set of information, a second polygon, and a second image. In one aspect, the second polygon and the second image are received upon prompting the user to select the second polygon and the second image from the plurality of password artifacts. The authentication module further derives a second image pattern upon aligning a sub image of a set of sub second images, created by slicing the second image, on each of a plurality of grids associated to the second polygon. The authentication module further verifies the user by validating the second set of information with the first set of information and comparing the second image pattern with the first image pattern. Thus, in this manner, the system authenticates the user based on a polygonal image based authentication technique, when the subset is validated and the second image pattern is matched with the first image pattern.

In another implementation, a method for facilitating authentication of a user logging into an Information Technology (IT) enabled application characterized by authenticating the user based on a polygonal image based authentication technique is disclosed. In order to authenticate the user, initially, a user may be registered on an IT enabled application based on a first set of information pertaining to the user. In one aspect, the user is registered by enabling the user to select a password artifact comprising a first polygon and a first image from a first set of images. The first polygon may comprise a plurality of grids. It may be noted that a grid indicates an area bounded by a set of vertices and a set of edges associated to the first polygon. Upon enabling the user, the first image may be sliced in order to derive a set of sub first images based on the plurality of grids. Subsequent to the slicing of the first image, a first image pattern may be derived by aligning a sub image, of the set of sub first images, on each of the plurality of grids in accordance with a preference defined by the user and thereby storing the first image pattern in a system database. Upon registering the user, the user may be authenticated by displaying a plurality of password artifacts comprising a plurality of polygons and a plurality of images. The plurality of polygons and the plurality of images include the first polygon and the first image. Subsequent to the displaying of the plurality of artifacts, a second set of information, a second polygon, and a second image may be received. In one aspect, the second polygon and the second image may be received upon prompting the user to select the second polygon and the second image from the plurality of password artifacts. Subsequently, a second image pattern may be derived upon aligning a sub image of a set of sub second images, created by slicing the second image, on each of a plurality of grids associated to the second polygon. Post deriving the second image pattern, the user may be verified by validating the second set of information with the first set of information and comparing the second image pattern with the first image pattern. Thus, in this manner, the user may be authenticated based on a polygonal image based authentication technique, when the subset is validated and the second image pattern is matched with the first image pattern. In one aspect, the aforementioned method for facilitating authentication of the user may be performed by a processor using programmed instructions stored in a memory of the system.

In yet another implementation, non-transitory computer readable medium embodying a program executable in a computing device for facilitating authentication of a user logging into an Information Technology (IT) enabled application characterized by authenticating the user based on a polygonal image based authentication technique is disclosed. The program may comprise a program code for registering a user on an IT enabled application based on a first set of information pertaining to the user, wherein the user is registered by enabling the user to select a password artifact comprising a first polygon and a first image from a first set of images, wherein the first polygon comprises a plurality of grids, and wherein a grid indicates an area bounded by a set of vertices and a set of edges associated to the first polygon, slicing the first image in order to derive a set of sub first images based on the plurality of grids, and deriving a first image pattern by aligning a sub image, of the set of sub first images, on each of the plurality of grids in accordance with a preference defined by the user and thereby storing the first image pattern in a system database. The program may comprise a program code for authenticating the user by displaying a plurality of password artifacts comprising a plurality of polygons and a plurality of images, wherein the plurality of polygons and the plurality of images include the first polygon and the first image, receiving a second set of information, a second polygon, and a second image, wherein the second polygon and the second image are received upon prompting the user to select the second polygon and the second image from the plurality of password artifacts, deriving a second image pattern upon aligning a sub image of a set of sub second images, created by slicing the second image, on each of a plurality of grids associated to the second polygon, and verifying the user by validating the second set of information with the first set of information and comparing the second image pattern with the first image pattern. Thus, in this manner, the user may be authenticated based on a polygonal image based authentication technique, when the subset is validated and the second image pattern is matched with the first image pattern.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The proposed invention facilitates authentication of a user logging into an Information Technology (IT) enabled application. It may be noted that the proposed invention authenticates the user based on a polygonal image based authentication technique. In other words, the proposed invention is a graphical password based authentication system called Polygonal Image Authentication System (PIAS). In order to authenticate the user using the graphical password based authentication system, initially, the user needs to be registered by a system hosting the IT enabled application.

During the registration phase, the user is required to fill his/her details such as username, date of a specific day in life, e-mail address and any other detail marked as mandatory depicted with '*' on the registration page. It may be noted that the aforementioned details may referred to as stored user credentials which may be stored in a system database for future reference. Subsequently, the user is required to choose a polygon (such as Triangle, Quadrilateral, Pentagon, and Hexagon etc.). It may be noted that the polygon comprises a plurality of grids wherein each grid indicates an area bounded by a set of vertices and a set of edges associated to the first polygon. Post selection of the polygon from aforementioned list of polygons, the user needs to select a set of images. It may be noted that the set of image may comprise either a list of distinct images or an image that is sliced to derive a plurality of images. Subsequent to the selection of images, the user aligns an image of the set of image on each of the plurality of grids associated to the polygon, selected by the user, to derive a first pattern. It may be noted that the user may any time, after deriving the pattern, modify the first pattern as per his/her preference.

Once registered with the system, if the user wishes to access resources stored in the system, the system authenticates the user before allowing the user to access such resources. In order to authenticate, the user prompts the user to enter User credentials (including Username and Password) which he/she has entered during the registration phase. The user may then be prompted to select a polygon and an image. It may be noted that the user may be facilitated a plurality of images stored in a memory of the system. Post selection of the polygon and the image, the system prompts the user to derive a second image pattern upon aligning a set of images on each of a plurality of grids associated to the second polygon. In one aspect, the set of images may be created either by slicing the second image to derive the set of images or selecting the set of images from a plurality of images displayed to the user.

Upon creating the second pattern, the system authenticates the user by comparing the user credentials with the stored user credentials and the second image pattern with the first image pattern. Thus, in this manner, the system authenticates the user based on a polygonal image based authentication technique, when the subset is validated and the second image pattern is matched with the first image pattern. While aspects of described system and method for facilitating authentication of a user logging into an Information Technology (IT) enabled application may be implemented in any number of different computing systems, environments, and/or configurations, the embodiments are described in the context of the following exemplary system.

Figure 1:
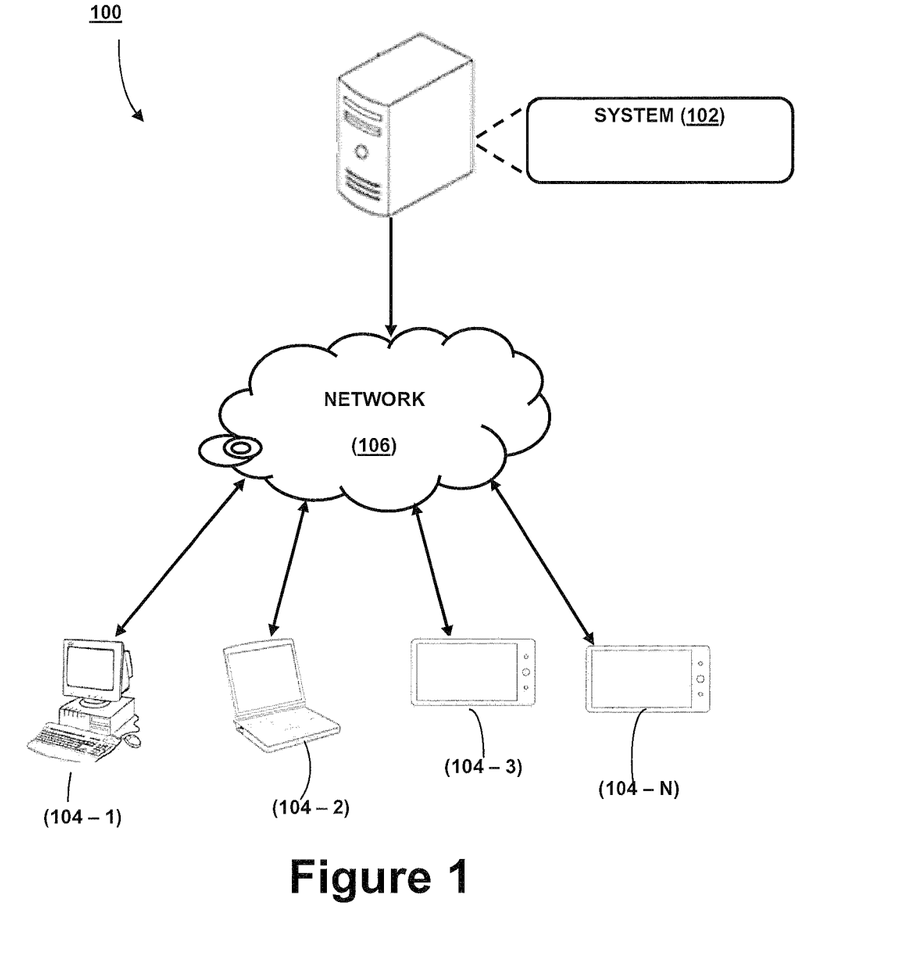
FIG. 1 illustrates a network implementation of a system for authentication of a user logging into an Information Technology (IT) enabled application, in accordance with an embodiment of the present subject matter.

Referring now to FIG. 1, a network implementation 100 of a system 102 for facilitating authentication of a user logging into an Information Technology (IT) enabled application. In order to authenticate the user, initially, the system 102 registers a user on an IT enabled application based on a first set of information pertaining to the user. In order to register the user, the system 102 enables the user to select a password artifact comprising a first polygon and a first image from a first set of images. The first polygon may comprise a plurality of grids. It may be noted that a grid indicates an area bounded by a set of vertices and a set of edges associated to the first polygon. Upon enabling the user, the system 102 slices the first image in order to derive a set of sub first images based on the plurality of grids. Subsequent to the slicing of the first image, the system 102 derives a first image pattern by aligning a sub image, of the set of sub first images, on each of the plurality of grids in accordance with a preference defined by the user and thereby storing the first image pattern in a system database. Upon registering the user, the system 102 authenticates the user by displaying a plurality of password artifacts comprising a plurality of polygons and a plurality of images. The plurality of polygons and the plurality of images include the first polygon and the first image. Subsequent to the displaying of the plurality of artifacts, the system 102 receives a second set of information, a second polygon, and a second image. In one aspect, the second polygon and the second image may be received upon prompting the user to select the second polygon and the second image from the plurality of password artifacts. Subsequently, the system 102 derives a second image pattern upon aligning a sub image of a set of sub second images, created by slicing the second image, on each of a plurality of grids associated to the second polygon. Post deriving the second image pattern, the system 102 verifies the user by validating the second set of information with the first set of information and comparing the second image pattern with the first image pattern. Thus, in this manner, the system 102 authenticates the user based on a polygonal image based authentication technique, when the subset is validated and the second image pattern is matched with the first image pattern.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, an IoT device, IoT gateway, portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
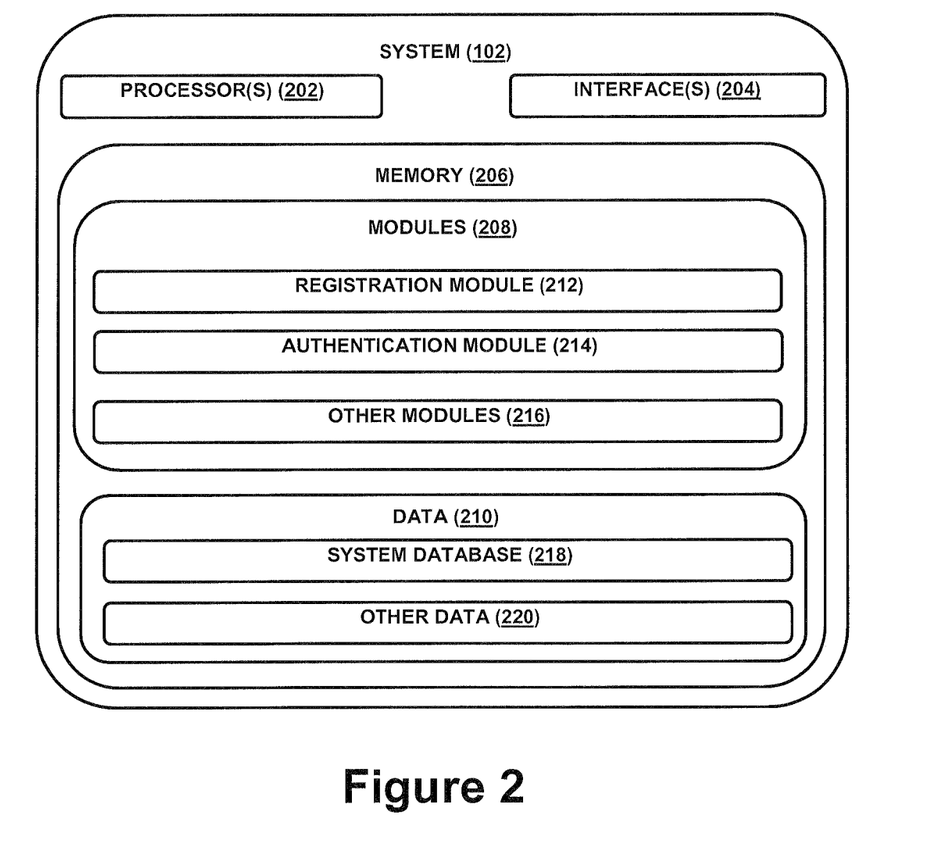
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a registration module 212, an authentication module 214, and other modules 216. The other modules 216 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 218 and other data 220. The other data 220 may include data generated as a result of the execution of one or more modules in the other modules 220.

As there are various challenges observed in the existing art, the challenges necessitate the need to build the system 102 for facilitating authentication of a user logging into an Information Technology (IT) enabled application based on a polygonal image based authentication technique. In order to authenticate the user, at first, a user may use the user device 104 to access the system 102 via the I/O interface 204. The user may register them using the I/O interface 204 to use the system 102. In one aspect, the user may access the I/O interface 204 of the system 102. The system 102 may employ the registration module 212 and the authentication module 214. The detail functioning of the modules is described below with the help of figures.

The present invention provides a system 102 for authenticating a user logging into an Information Technology (IT) enabled application whereby authentication keys may be integrated under an intelligent Image based approach. It may be noted that the system 102 facilitates a graphical password based authentication system called a Polygonal Image Authentication System (PIAS). In one aspect, the system 102 may follow the below authentication concepts for authenticating the user. The authentication concepts comprise:

1. Authentication data (A), hereinafter also referred to as a set of information, that may be provided by the user for verification.
2. Complementary data (C), is stored on the system database 218 and used to validate the authentication data (A) provided by the user.
3. Complementation function (f) provides mapping of A with C.
4. Authentication function (L) used to authenticate the user. It may be equality function for comparison of (A) and (C).
5. Selection function (S) allows users to create or change data in (A) or (C).

Figure 3:
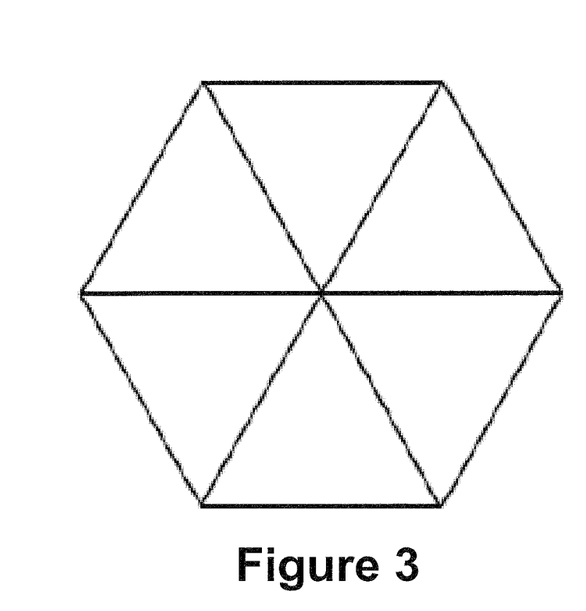
FIGS. 3, 4 and 5 illustrate a method for deriving a first pattern, in accordance with an embodiment of the present subject matter.
Figure 4:
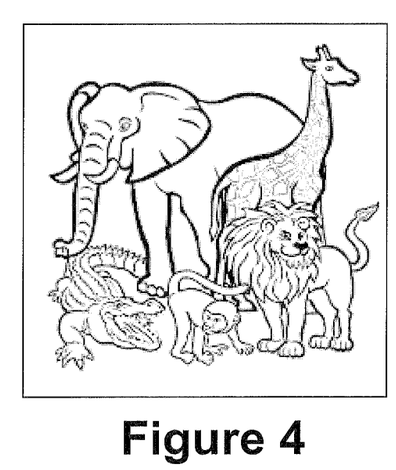

In order to implement the aforementioned authentication concepts for authenticating the user, the registration module 212 registers the user on an IT enabled application based on a first set of information pertaining to the user. The first set of information may include, but not limited to, Username, Password, Name, Age, Gender, Address, and Date of Birth. Upon receipt of the set of information, the user lays down a first step towards registration with the system 102. In the second step, the registration module 212 registers the user by enabling the user to select a password artifact. The password artifact comprises a first polygon and a first image from a first set of images, as shown in FIGS. 3 and 4 respectively. In one aspect, the first polygon may be selected from a group comprising a Triangle, a Quadrilateral, a Pentagon, and a Hexagon. It is understood that the first polygon comprises a plurality of grids. It may be noted that a grid indicates an area bounded by a set of vertices and a set of edges associated to the first polygon.

Subsequent to the selection of the password artifact, the registration module 212 slices the first image into a set of sub first images based on the plurality of grids. Upon slicing the first image, the registration module 212 derives a first image pattern by aligning a sub image, of the set of sub first images, on each of the plurality of grids in accordance with a preference defined by the user, as shown in FIG. 5.

Figure 5:
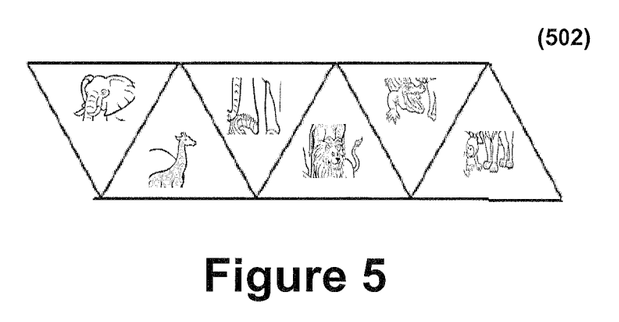

As illustrated in the FIG. 5, the first image is sliced into '6' sub images. This is because the first polygon selected by the user is having '6' grids and therefore the first image is sliced into '6' sub images. Once sliced, each sub image of '6' sub images are aligned over a grid, associated to the first polygon, as per the preference defined by the user. This alignment of the sub images over the grids, as shown in the FIG. 5, in a specific preference indicates a first image pattern 502. The first image pattern 502, once derived, is stored in the system database 218 for future reference. In an alternative embodiment, the user may select distinct images, rather than slicing the first image, based on a count of grids present in the first polygon.

From the above, it may be understood that the first set of information and the password artifact including the first image pattern 502, selected by the user during registration, indicates the Complementary data (C). The Complementary data (C) may be referred while authenticating the user. Thus, in this manner, the system 102 facilitates the user to get registered with the system 102 in order to access resources stored in the system 102.

Post registering with the system 102 and in order to allow access to the registered with the system 102, the authentication module 214 prompts the user to provide a second set of information including Username and Password which he/she has used during the registration. The authentication module 214 may further prompt the user to select a password artifact including a second polygon and a second image from a plurality of password artifacts displayed to the user on a display unit of the system 102. The plurality of password artifacts comprises a plurality of polygons and a plurality of images including the first polygon and the first image.

Post receipt of the second set of information and selection of the second polygon and the second image, the authentication module 214 slices the second image to create a set of sub second images. Further, the authentication module 214 prompts the user to derive the second image pattern upon aligning a sub image of the set of sub second images on each of the plurality of grids associated to the second polygon. In one embodiment, the user needs to derive the second image pattern within a predefined time. In one aspect, the predefined time is '30' seconds. In one embodiment, if the user fails to provide the derive the second image pattern within the predefined time, then the user may not be allowed to access the resources and may be barred to re-authenticate himself/herself up till a predefined time is lapsed. From the above, it may be understood that the second set of information (including the Username and the Password) and the second image pattern indicate the Authentication data (A).

Based on the Authentication data (A) and the Complementary data (C), the authentication module 214, at first, verifies the identity of the user by using a Complementation function (f). It may be noted that the Complementation function (f) maps of Authentication data (A) with the Complementary data (C). Upon implementing the Complementation function (f), an Authentication function (L) is used that lookups the system database 218 and verifies the identity of the user, if the Username and Password present in the Authentication data (A) is mapped with the Username and Password present in the Complementary data (C).

If the Authentication data (A) is matched with the Complementary data (C), the authentication module 214, secondly, verifies the second image pattern with the first image pattern by using the Authentication function (L). It may be noted that the user is authenticated when the second image pattern is matched with the first image pattern. Thus, in this manner, the authentication module 214 authenticates the user based on a polygonal image based authentication technique.

Figure 6A:
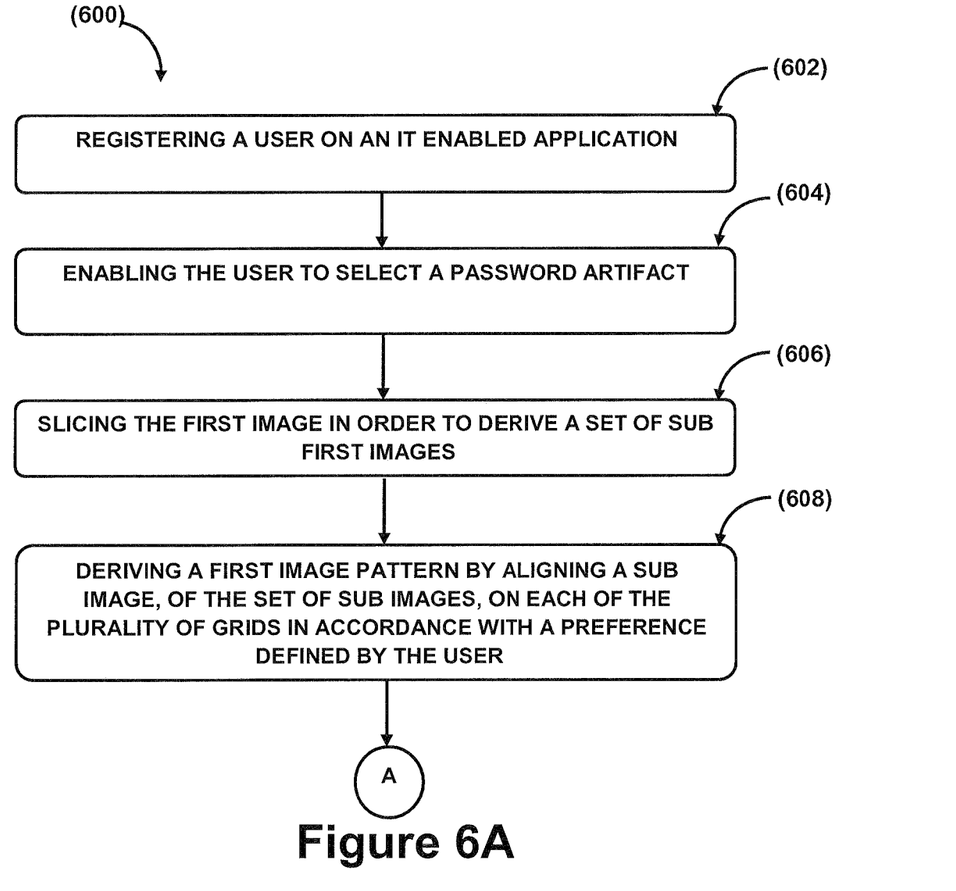
FIGS. 6A and 6B illustrate a method for authentication of a user logging into an Information Technology (IT) enabled application, in accordance with an embodiment of the present subject matter.
Figure 6B:
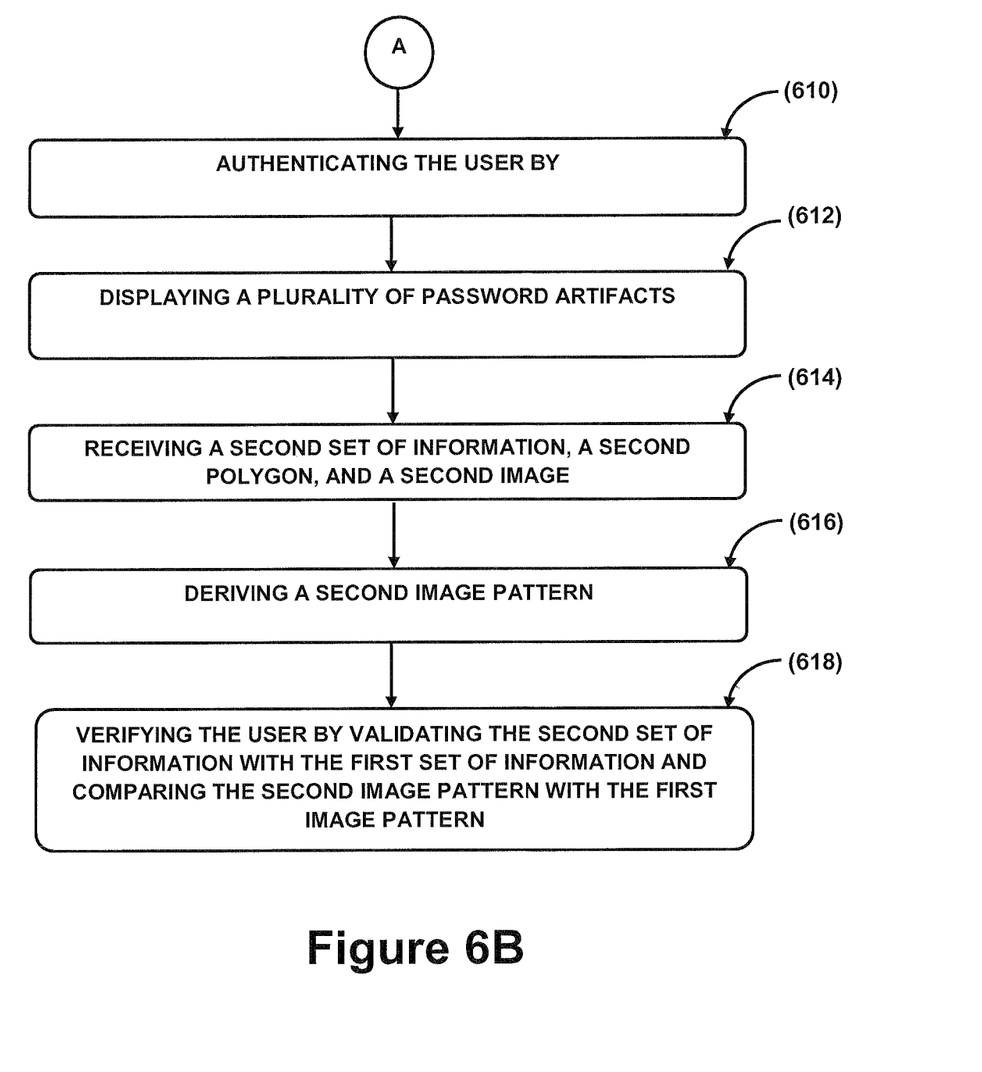

Referring now to FIGS. 6A and 6B, a method 600 for facilitating authentication of a user logging into an Information Technology (IT) enabled application based on a polygonal image based authentication technique is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented as described in the system 102.

At block 602, a user may be registered on an IT enabled application based on a first set of information pertaining to the user. In one implementation, the user may be registered on the IT enabled application by the registration module 212.

At block 604, the user may be registered by enabling the user to select a password artifact comprising a first polygon and a first image from a first set of images. The first polygon may comprise a plurality of grids wherein a grid indicates an area bounded by a set of vertices and a set of edges associated to the first polygon. In one implementation, the user may be enabled to select a password artifact by the registration module 212.

At block 606, the first image may be sliced in order to derive a set of sub first images based on the plurality of grids. In one implementation, the first image may be sliced by the registration module 212.

At block 608, a first image pattern may be derived by aligning a sub image, of the set of sub first images, on each of the plurality of grids in accordance with a preference defined by the user and thereby storing the first image pattern in a system database 218.

At block 610, the user may be authenticated by the authentication module 214.

At block 612, in one implementation, the user may be authenticated upon displaying a plurality of password artifacts comprising a plurality of polygons and a plurality of images. In one aspect, the plurality of polygons and the plurality of images may include the first polygon and the first image. In one implementation, the plurality of password artifacts may be displayed by the authentication module 214.

At block 614, a second set of information, a second polygon, and a second image may be received. In one aspect, the second polygon and the second image may be received upon prompting the user to select the second polygon and the second image from the plurality of password artifacts. In one implementation, the second set of information, the second polygon, and the second image may be received by the authentication module 214.

At block 616, a second image pattern may be derived upon aligning a sub image of a set of sub second images, created by slicing the second image, on each of a plurality of grids associated to the second polygon. In one implementation, the second image pattern may be derived by the authentication module 214.

At block 618, the user may be verified by validating the subset with the set of information and comparing the second image pattern with the first image pattern, thereby authenticating the user based on a polygonal image based authentication technique, when the second set of information is validated and the second image pattern is matched with the first image pattern. In one implementation, the user may be verified by the authentication module 214.

Exemplary embodiments discussed above may provide certain advantages. Though not required to practice aspects of the disclosure, these advantages may include those provided by the following features.

Some embodiments enable a system and a method to remove the need to memorize and remember long and complex textual pattern.

Some embodiments enable a system and a method to facilitate secure by bi-factoring authentication to be based on an image bound technique.

Although implementations for methods and systems for facilitating authentication of a user logging into an Information Technology (IT) enabled application based on a polygonal image based authentication technique have been described in language specific to structural features and/or methods, it is to be understood that the appended claims are not necessarily limited to the specific features or methods described. Rather, the specific features and methods are disclosed as examples of implementations for facilitating authentication of the user.

The invention claimed is:

1. A method for facilitating authentication of a user logging into an Information Technology (IT) enabled application characterized by authenticating the user based on a polygonal image based authentication technique, the method comprising:

registering, by a processor, a user on an IT enabled application based on a first set of information pertaining to the user, wherein the user is registered by:
enabling the user to select a password artifact comprising a first polygon and a first image from a first set of images, wherein the first polygon comprises a plurality of grids, and wherein a grid indicates an area bounded by a set of vertices and a set of edges associated to the first polygon;
slicing the first image in order to derive a set of sub first images based on the plurality of grids; and
deriving a first image pattern by aligning a sub image, of the set of sub first images, on each of the plurality of grids in accordance with a preference defined by the user and thereby storing the first image pattern in a system database; and authenticating, by the processor, the user by:
displaying a plurality of password artifacts comprising a plurality of polygons and a plurality of images, wherein the plurality of polygons and the plurality of images include the first polygon and the first image;
receiving a second set of information, a second polygon, and a second image, wherein the second polygon and the second image are received upon prompting the user to select from the plurality of password artifacts, wherein the user is prompted to select the second polygon and the second image from the plurality of password artifacts;
deriving a second image pattern upon aligning a sub image of a set of sub second images, created by slicing the second image, on each of a plurality of grids associated to the second polygon within a predefined time; and
verifying the user by validating the second set of information with the first set of information and comparing the second image pattern with the first image pattern,
thereby authenticating the user based on a polygonal image based authentication technique, when the subset is validated and the second image pattern is matched with the first image pattern.

2. The method as claimed in claim 1, wherein the first polygon and the second polygon are selected from a group comprising a Triangle, a Quadrilateral, a Pentagon, and a Hexagon.

3. A system for facilitating authentication of a user logging into an Information Technology (IT) enabled application characterized by authenticating the user based on a polygonal image based authentication technique, the system comprising:

a processor; and
a memory coupled to the processor, wherein the processor is capable of executing a plurality of modules stored in the memory, and wherein the plurality of modules comprising:
a registration module for registering a user on an IT enabled application based on a first set of information pertaining to the user, wherein the registration module registers the user by:
enabling the user to select a password artifact comprising a first polygon and a first image from a first set of images, wherein the first polygon comprises a plurality of grids, and wherein a grid indicates an area bounded by a set of vertices and a set of edges associated to the first polygon;
slicing the first image in order to derive a set of sub first images based on the plurality of grids; and
deriving a first image pattern by aligning a sub image, of the set of sub first images, on each of the plurality of grids in accordance with a preference defined by the user and thereby storing the first image pattern in a system database; and an authentication module for authenticating the user by:
displaying a plurality of password artifacts comprising a plurality of polygons and a plurality of images, wherein the plurality of polygons and the plurality of images include the first polygon and the first image;
receiving a second set of information, a second polygon, and a second image, wherein the second polygon and the second image are received upon prompting the user to select the second polygon and the second image from the plurality of password artifacts, wherein the user is prompted to select the second polygon and the second image from the plurality of password artifacts;
deriving a second image pattern upon aligning a sub image of a set of sub second images, created by slicing the second image, on each of a plurality of grids associated to the second polygon within a predefine time; and
verifying the user by validating the second set of information with the first set of information and comparing the second image pattern with the first image pattern,
thereby authenticating the user based on a polygonal image based authentication technique, when the subset is validated and the second image pattern is matched with the first image pattern.

4. The system as claimed in claim 3, wherein the first polygon and the second polygon is selected from a group comprising a Triangle, a Quadrilateral, a Pentagon, and a Hexagon.

5. A non-transitory computer readable medium embodying a program executable in a computing device for facilitating authentication of a user logging into an Information Technology (IT) enabled application characterized by authenticating the user based on a polygonal image based authentication technique, the program comprising a program code:

a program code for registering a user on an IT enabled application based on a first set of information pertaining to the user, wherein the user is registered by:
enabling the user to select a password artifact comprising a first polygon and a first image from a first set of images, wherein the first polygon comprises a plurality of grids, and wherein a grid indicates an area bounded by a set of vertices and a set of edges associated to the first polygon;
slicing the first image in order to derive a set of sub first images based on the plurality of grids; and
deriving a first image pattern by aligning a sub image, of the set of sub first images, on each of the plurality of grids in accordance with a preference defined by the user and thereby storing the first image pattern in a system database; and a program code for authenticating the user by:
displaying a plurality of password artifacts comprising a plurality of polygons and a plurality of images, wherein the plurality of polygons and the plurality of images include the first polygon and the first image;

receiving a second set of information, a second polygon, and a second image, wherein the second polygon and the second image are received upon prompting the user to select from the plurality of password artifacts, wherein the user is prompted to select the second polygon and the second image from the plurality of password artifacts;

deriving a second image pattern upon aligning a sub image of a set of sub second images, created by slicing the second image, on each of a plurality of grids associated to the second polygon within a predefine time; and verifying the user by validating the second set of information with the first set of information and comparing the second image pattern with the first image pattern, thereby authenticating the user based on a polygonal image based authentication technique, when the subset is validated and the second image pattern is matched with the first image pattern.

* * * * *